(12) United States Patent
Fukino et al.

(10) Patent No.: US 9,297,981 B2
(45) Date of Patent: Mar. 29, 2016

(54) LENS BARREL AND IMAGING DEVICE

(71) Applicant: NIKON CORPORATION, Tokyo (JP)

(72) Inventors: Kunihiro Fukino, Fujisawa (JP); Masaaki Kusano, Kawasaki (JP)

(73) Assignee: NIKON CORPORATION, Tokyo (JP)

( * ) Notice: Subject to any disclaimer, the term of this patent is extended or adjusted under 35 U.S.C. 154(b) by 0 days.

(21) Appl. No.: 14/511,514

(22) Filed: Oct. 10, 2014

(65) Prior Publication Data

US 2015/0022900 A1 Jan. 22, 2015

Related U.S. Application Data

(63) Continuation of application No. 13/950,940, filed on Jul. 25, 2013, now abandoned, which is a continuation of application No. 13/009,431, filed on Jan. 19, 2011, now abandoned.

(30) Foreign Application Priority Data

Jan. 21, 2010 (JP) ................................ 2010-010881

(51) Int. Cl.
G02B 15/14 (2006.01)
G02B 7/02 (2006.01)
G02B 7/10 (2006.01)
G03B 3/10 (2006.01)
G02B 7/04 (2006.01)
G02B 15/16 (2006.01)

(52) U.S. Cl.
CPC ........ *G02B 7/10* (2013.01); *G02B 7/021* (2013.01); *G02B 7/023* (2013.01); *G02B 7/04* (2013.01); *G02B 7/102* (2013.01); *G02B 15/161* (2013.01); *G03B 3/10* (2013.01); *G03B 2205/0046* (2013.01)

(58) Field of Classification Search
USPC .................. 359/694, 699, 701, 819, 822, 823
See application file for complete search history.

(56) References Cited

U.S. PATENT DOCUMENTS

| | | | |
|---|---|---|---|
| 5,890,391 | A | 4/1999 | Okada |
| 6,556,359 | B2 | 4/2003 | Emura et al. |
| 6,661,585 | B2 | 12/2003 | Okawara |

(Continued)

FOREIGN PATENT DOCUMENTS

| | | |
|---|---|---|
| CN | 1637455 A | 7/2005 |
| JP | A-02-141712 | 5/1990 |

(Continued)

OTHER PUBLICATIONS

Mar. 31, 2014 Office Action issued in Chinese Patent Application No. 201110026837.X (with translation).

(Continued)

*Primary Examiner* — Jack Dinh
(74) *Attorney, Agent, or Firm* — Oliff PLC

(57) ABSTRACT

A lens barrel having an image forming optical system including a first optical system and a second optical system which is moveable independently from the first optical system, a first driving portion which drives the first optical system during a magnification changing operation of the image forming optical system, and a second driving portion which drives the second optical system during the magnification changing operation, along with driving the second optical system during a focus adjustment of the image forming system.

21 Claims, 3 Drawing Sheets

(56) References Cited

U.S. PATENT DOCUMENTS

| | | | |
|---|---|---|---|
| 7,050,244 | B2 | 5/2006 | Hayashi et al. |
| 2005/0162752 | A1 | 7/2005 | Hayashi et al. |
| 2006/0272440 | A1 | 12/2006 | Mori et al. |
| 2008/0211955 | A1 | 9/2008 | Avital et al. |
| 2008/0259466 | A1 | 10/2008 | Avital et al. |
| 2008/0297000 | A1 | 12/2008 | Nishiyama et al. |
| 2010/0214671 | A1 | 8/2010 | Fukino |
| 2011/0141340 | A1 | 6/2011 | Yumiki et al. |

FOREIGN PATENT DOCUMENTS

| | | |
|---|---|---|
| JP | 02-262112 | 10/1990 |
| JP | A-04-025811 | 1/1992 |
| JP | A-05-088066 | 4/1993 |
| JP | A-08-240759 | 9/1996 |
| JP | A-09-191665 | 7/1997 |
| JP | A-2000-089086 | 3/2000 |
| JP | A-2003-177299 | 6/2003 |
| JP | A-2004-077705 | 3/2004 |
| JP | A-2004-159425 | 6/2004 |
| JP | A-2006-350092 | 12/2006 |
| JP | A-2008-514978 | 5/2008 |
| JP | A-2008-289346 | 11/2008 |
| WO | WO 2008/139723 A1 | 11/2008 |

OTHER PUBLICATIONS

Mar. 18, 2014 Office Action issued in Japanese Application No. 2010-010881 (with translation).
English translation of Apr. 23, 2013 Decision of Rejection issued in Japanese Patent Application No. 2010-010881.
English translation of Apr. 23, 2013 Decision for Dismissal issued in Japanese Patent Application No. 2010-010881.
Dec. 10, 2013 Inquiry issued in Japanese Patent Application No. 2010-010881 (with translation).
Jan. 10, 2012 Office Action issued in Japanese Application No. 2010-010881 (with translation).
Jun. 25, 2012 Office Action issued in U.S. Appl. No. 13/009,431.
Aug. 21, 2012 Notice of Reasons for Rejection issued in Japanese Patent Application No. 2010-010881 (with translation).
Apr. 23, 2013 Office Action issued in Japanese Patent Application No. 2010-010881.

LENS BARREL AND IMAGING DEVICE

This is a Continuation Application of application Ser. No. 13/950,940 filed Jul. 25, 2013, which is a Continuation of application Ser. No. 13/009,431 filed Jan. 19, 2011, which is a non-provisional application, and claims priority under 35 U.S.C. §119 to Japanese Patent Application No. 2010-010881 filed on Jan. 21, 2010. The content of the application is incorporated herein by reference in its entirety.

BACKGROUND OF THE INVENTION

1. Field of the Invention

The present invention relates to a lens barrel and to an imaging device.

2. Description of the Related art

Japanese Unexamined Patent Publication No. 2000-89086 discloses an internal focusing zoom lens barrel which changes the focal point of the optical system by moving a middle lens of the optical system, changing the magnification of the optical system by changing spacing of a plurality of lenses.

SUMMARY OF THE INVENTION

The lens barrel of the above mentioned prior art has a complex structure combining a large number of parts. Because of this, there are many production requirements, and it cannot be said to have high productivity.

The problem to be solved by the present invention is to provide a lens barrel and imaging device having high productivity.

The present invention solves the above problem by the following means.

In order to achieve the object mentioned above, according to the first aspect of the present invention, there is provided a lens barrel comprising an image forming optical system including a first optical system and a second optical system which is moveable independently from the first optical system, a first driving portion which drives the first optical system during a magnification changing operation of the image forming optical system, and a second driving portion which drives the second optical system during the magnification changing operation, along with driving the second optical system during a focus adjustment of the image forming system.

A driving amount of the second optical system by the second driving portion during the focus adjustment may be determined according to a focal length of the image forming optical system.

The first driving portion may be a cam ring having a cam which engages with a holding member which holds the first optical system.

The lens barrel may comprise a guide shaft which guides movement of the second optical system, provided at a holding member which holds the second optical system, and a support member which supports the guide shaft may be provided to the lens barrel.

The second driving portion may comprise a linear actuator which drives the guide shaft with respect to the support member.

The linear actuator may be arranged at the second optical system side of the support member.

The lens barrel may comprise a second guide shaft, which guides the movement of the second optical system, provided at the holding member which holds the second optical system, a second linear actuator which drives the second guide shaft, and a control portion which selectively controls the driving of the second actuator.

In order to achieve the object mentioned above, according to the second aspect of the present invention, there is provided an imaging device provided with the above mentioned lens barrel.

According to the present invention, it is possible to provide a lens barrel and imaging device having high productivity.

DETAILED DESCRIPTION OF THE PREFERRED EMBODIMENT

Figure 1:
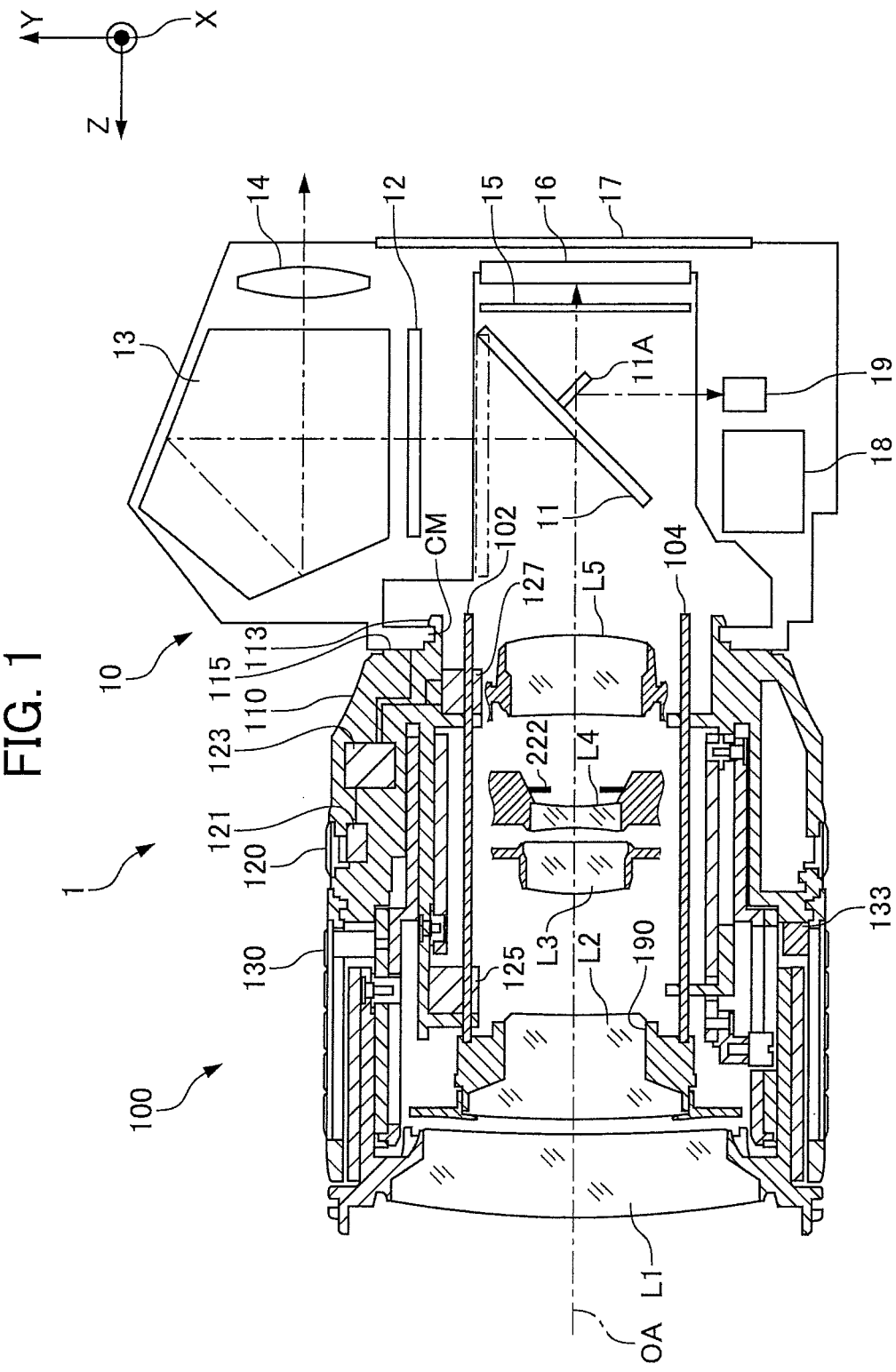
FIG. 1 is a drawing conceptually showing a camera of one embodiment of the present invention.

Below, an embodiment of the invention will be explained referring to the drawings and the like.

FIG. 1 is a drawing conceptually showing the camera 1 which is one embodiment of the present invention.

Further, in each of the drawings below, in order to facilitate explanations and understanding, an XYZ Cartesian coordinate system has been established. In this coordinate system, in the camera position in the case of photographing a landscape format image with the photographer holding the optical axis OA horizontal (below referred to as the correct position), the direction going towards the left side as seen from the photographer is the X plus direction and the direction going upwards in the correct position is the Y plus direction. Furthermore, the direction towards the photographic subject in the correct position is the Z plus direction. This Z plus direction is called the front face side, and the Z minus direction is called the rear face side. Furthermore, a movement in a direction parallel to the optical axis OA (namely, the Z axis) is called "translation", and a rotation having the optical axis OA as its center is called a "rotation".

The camera 1 is constituted of the camera main body 10, and the lens barrel 100.

The lens barrel 100 is a so-called zoom lens which has a focal length which can be adjustably set. The lens barrel 100 is provided with a plurality of lenses (L1 to L5) which constitute a photographic optical system, and an iris device 222 which regulates the incident light amount by changing its opening diameter. Further, the lens barrel 100 is provided with a lens mount 113 which removably engages with the camera mount CM, and is removably mounted to the camera body 10 by this lens mount 113. In this way, it is possible to photograph with the camera 1 while changing to a different lens barrel depending on the intended use.

The camera main body 10 is provided with a quick return mirror 11, a finder screen 12, a pentaprism 13, an eyepiece optical system 14, a shutter 15, an image sensor 16, a display device 17, a control device 18, a ranging sensor 19, and the like.

The quick return mirror 11 is a mirror provided so as to be capable of swinging in the camera main body 10, for bending the optical path of the photographic subject light condensed by the lens barrel 100 towards the finder screen 12. The quick return mirror 11, in response to a release operation, moves to a withdrawn position (the dot and chain line in FIG. 1) where it does not obstruct the incidence of photographic subject light onto the image sensor 16.

Further, a portion of the quick release mirror 11 is a half-mirror, and at a rear face position corresponding to the position of this half-mirror portion, a sub-mirror 11A is disposed. The sub-mirror 11A guides the photographic subject image light which has passed through the half-mirror position of the quick return mirror 11 to the ranging sensor 19. The sub-mirror 11A moves so as to lie along the rear face of the quick return mirror 11 along with the movement to the withdrawn position of the quick return mirror 11.

The finder screen 12 is a screen for forming an image of the photographic subject image reflected by the quick return mirror 11, and is arranged between the quick return mirror 11 and the pentaprism 13.

The pentaprism 13 is a prism having a pentagonal cross-sectional form, and is disposed at the upper portion of the camera body 10 in a state where it is set horizontally. The pentaprism 13 guides the image formed at the finder screen 12 to the eyepiece optical system 14 as an erect image.

The eyepiece optical system 14 is an optical system for observing an enlargement of the photographic subject image which is made an erect image by the pentaprism 13, and is arranged at the rear face side (photographer side) of the pentaprism 13.

The shutter 15 opens and closes according to a release operation, and controls the exposure time of the photographic subject image light which forms an image at the image sensor 16.

The image sensor 16 converts the photographic subject image which is imaged by the lens barrel 100 into an electric signal, and is a photoelectric conversion element such as, for example, a CCD or the like. The image sensor 16 is provided in a state where its light receiving face is perpendicular to the optical axis OA, at the rear face side (the right side in FIG. 1) of the inner portion of the camera main body 10.

The display device 17 is provided with a display panel such as a liquid crystal panel or the like provided at the rear face side (photographer side) of the outside of the camera main body 10. The display device 17 displays the photographed image and information related to photographing such as the exposure time and the like on the display panel.

The control device 18 is constituted to be provided with a CPU or the like, and centrally controls the above described various constituent elements of the camera main body 10 and the lens barrel 100 mounted to the camera main body 10.

The ranging sensor 19 detects the distance information to the photographic subject from the photographic subject image light incident via the sub-mirror 11A, and outputs this distance information to the control device 18.

The lens barrel 100 is integrally joined to the camera main body 10 as described above to constitute the camera 1. In the joined state, the control device 18 of the camera main body 10 and the electric power source, not shown, are connected to the lens barrel 100 via the connection terminals, not shown, so that the later explained linear actuator 125 (active during focusing and zooming) and the iris device 222 and the like in the lens barrel are controlled by the control device 18.

The camera 1 is operated as described below when photographing.

When the shutter button, not shown, provided on the camera main body 10 is operated by pressing (release operation), the quick return mirror 11 moves to the withdrawn position. The shutter 15 opens and closes in response to the release operation and exposes the image sensor 16 to the photographic subject image light for a prescribed length of time. The image sensor 16 forms an image by converting the photographic subject image light to an electric signal. The image data imaged by the image sensor 16 is recorded at the recording portion, not shown. In this way, photographing is carried out. During this photographing time, the iris device 222 and the linear actuator 125 and the like in the lens barrel 100 are controlled by the control device 18 of the camera main body 100. Accordingly, the control device 18, along with controlling the iris device 222 based on the photometric information from the photometric sensor, not shown, provided by the camera main body 10, also controls the linear actuator 125 based on the ranging information from the ranging sensor 19 at the time of the autofocus operation.

Figure 2:
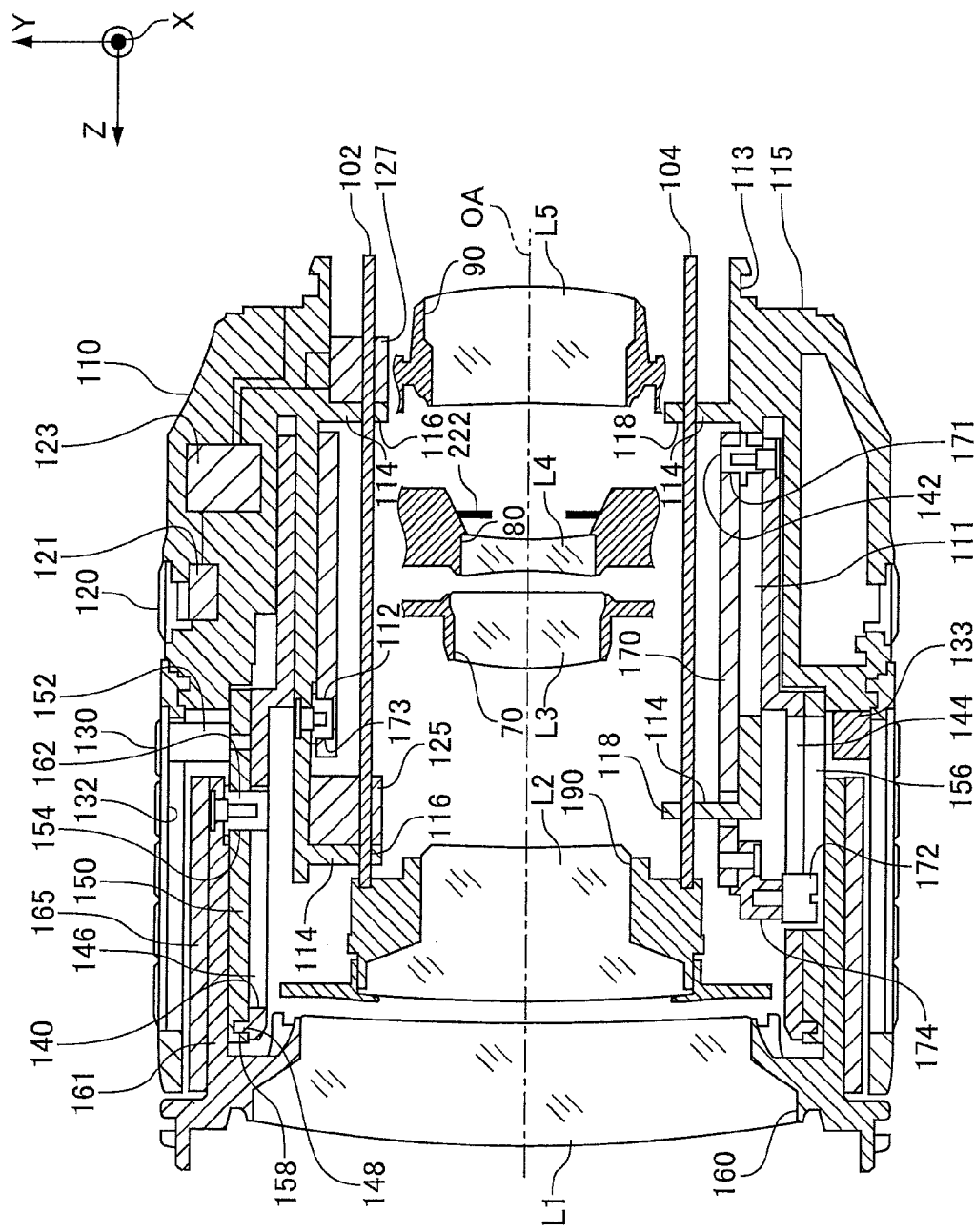
FIG. 2 is an enlarged view of the lens barrel of FIG. 1, and is a cross sectional view at the wide angle side end.
Figure 3:
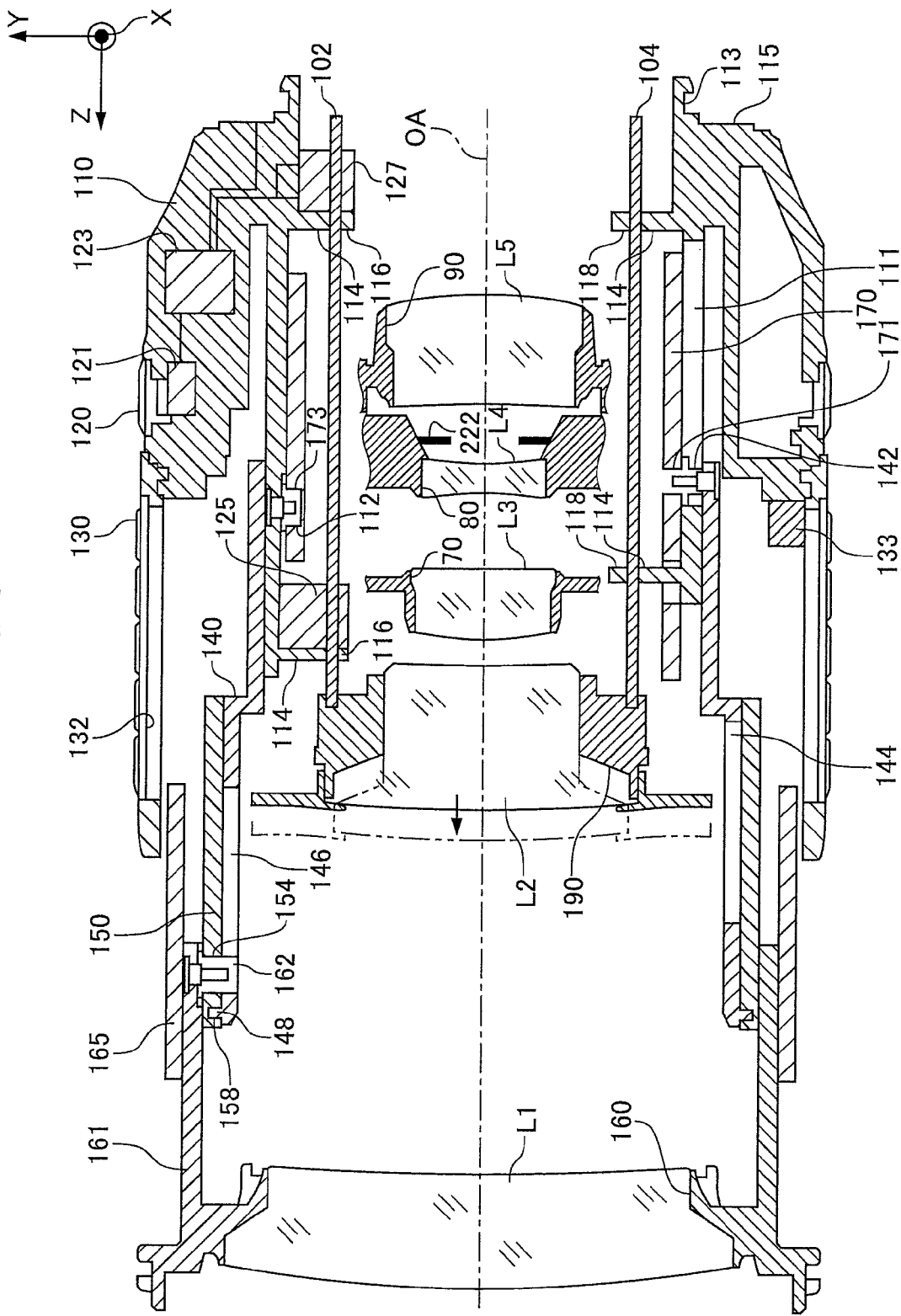
FIG. 3 is a cross sectional view of the telephoto side end of the lens barrel.

Next, a detailed explanation of the lens barrel 100 will be given with reference to FIG. 2 and FIG. 3, in addition to the above mentioned FIG. 1. FIG. 2 is an enlarged view of the lens of FIG. 1, and is a cross sectional view at the wide angle side end. FIG. 3 is a cross sectional view of the telephoto side end of the lens barrel.

The lens barrel 100, as mentioned above, is provided with 5 groups of lenses L1, L2, L3, L4, and L5 arranged in order along a common optical axis OA. The lens groups L1, L2, L3, L4 and L5 are respectively held by the first lens frame 160, the second lens frame 190, the third lens frame 70, the fourth lens frame 80, and the fifth lens frame 90.

Further, the lens barrel 100 is an internal focusing type zoom lens with the lens L2 as the focusing lens, and by moving each lens L1, L2, L3, L4, and L5 in the optical axis direction (Z direction) by a respective prescribed amount, the focal distance of the lens barrel 100 as a whole is continuously changed. FIG. 2 shows the lens barrel 100 at the wide angle end (the end of the side at which the focal length is short) state, and FIG. 3 shows the lens barrel 100 at the telephoto end (the end of the side at which the focal length is long) state. Further, by moving the lens L2 in the optical axis direction, the focus position changes. Furthermore, the fourth lens frame 80 which holds the lens L4 is provided with the iris device 222 which changes the light path diameter of the optical system including the lens L4.

The lens barrel 100 has a fixed tube 110 which is fixed to the lens mount 113 which can be mounted to and dismounted from the camera main body 10. The inner tube 140, the central tube 150, the outer tube 161, and the zoom ring 130 are coaxially disposed in this order, from the inside at the front face side of the fixed tube 110.

The cam tube 170 which is freely rotatable with respect to the fixed tube 110 is disposed at the inner side of the fixed tube 110. A pair of guide bars 102 and 104 is disposed parallel to the optical axis OA further to the inside of the cam tube 170.

The fixed tube 110 has the translation groove 111, the cam pin 112, the lens mount 113 and the support portion 114. The translation groove 111 extends along the optical axis OA direction of the lens barrel 100. The cam pin 112 projects towards the inner side radial direction from the inner peripheral face of the fixed tube 110, and engages with the cam groove 173 of the later described cam tube 170.

The fixed tube 110 is fixed with respect to the camera main body 10 by making the lens mount 113 engage with the camera mount CM. The mount face 115 of the rear end of the fixed tube 110, on the fixed tube 110 fixed to the camera main body 10, closely contacts the front face of the camera mount CM on the camera main body 10. In this way, the lens barrel 100 as a whole has its position determined with respect to the camera main body 10.

The support portion 114 projects towards the inner side radial direction from the inner peripheral face of the fixed tube 110 and supports the guide bars 102 and 104. The support portion 114 which supports the guide bar 102 disposed at the upper side in the figures has the respective fitting holes 116 formed to be complementary with the shape of the outer periphery of the guide bar 102. The guide bar 102 is inserted through and supported by the fitting holes 116. In this way, the guide bar 102 permits movement in the optical axis OA direction, while restricting displacements in other directions.

With respect to this, the support portion 114 which supports the guide bar 104 disposed at the lower side in the drawings has a U-shaped groove 118 including parallel faces with the same interspace as the diameter of the guide bar 104. This guide bar 104 is passed through the U-shaped groove 118, and permits movement in the optical axis OA direction, while restricting displacements in directions perpendicular to the optical axis OA.

The pair of guide bars 102, 104 is fixed to the second lens frame 190. In this way, the guide bars 102 and 104 guide the movement in the optical axis OA direction of the second lens frame 190 which holds the lens L2. Further, the guide bar 104 restricts the rotation about the guide bar 102 of the lens L2 held by the second lens frame 190.

The inner tube 140 has the cam follower 142, the escape hole 144, the translation groove 146 and the engaging protuberance 148. The cam follower 142 projects towards the inner side radial direction of the lens barrel 100, in the vicinity of the rear end of the inner tube 140. The translation groove 146 extends in the optical axis OA direction of the lens barrel 100. The engaging protuberance 148 also projects towards the outer side radial direction of the lens barrel 100.

The cam follower 142 passes through the translation groove 111, and engages with the cam groove 171 of the later described cam tube 170. In this way, when the cam tube 170 rotates, rotation of the inner tube 140 about the optical axis OA is restricted. Further, driving power for moving the inner tube 140 in the optical axis OA direction can be transmitted form the cam groove 171 to the cam follower 142.

The escape hole 144 is arranged at a different position from the translation groove 146 in the peripheral direction of the lens barrel 100. The cam follower 172 of the later described cam tube 170 is inserted through the escape hole 144.

The central tube 150 has a cam follower 152, a cam groove 154, a translation groove 156, and an engaging peripheral groove 158. The cam follower 152 projects towards the outer side in the radial direction of the lens barrel 100, and engages with the guide groove 132 of the zoom ring 130. The cam groove 154 extends in an inclined manner with respect to the optical axis OA.

The translation groove 156 is arranged at a different position than the cam groove 154 in the peripheral direction of the lens barrel 100. The translation groove 156 extends in the optical axis OA direction, and engages with the cam follower 172 of the later described cam tube 170.

The engaging peripheral groove 158 is formed along a face perpendicular to the optical axis OA at the inner peripheral face of the central tube 150. The engaging peripheral groove 158 engages with the engaging protuberance 148 of the inner tube 140. In this way, the central tube 150 moves integrally with the inner tube 140 in the optical axis OA direction, but is free to rotate separately from the inner tube 140 about the optical axis OA.

The outer tube 161 has the cam follower 162. The cam follower 162 projects to the inner side radial direction of the lens barrel 100, and engages with the cam groove 154 of the central tube 150 and the translation groove 146 of the inner tube 140. In this way, when the central tube 150 rotates about the optical axis OA, the cam follower 162 restricts rotation about the optical axis OA of the outer tube 161, and transmits a driving force in the optical axis OA direction to the outer tube 161.

Further, the outer tube 161 is joined with the first lens frame 160 which holds the first lens L1. In this way, when the outer tube 161 moves in the optical axis OA direction, the first lens L1 also moves along the optical axis OA.

The cam tube 170 is arranged to be freely rotatable at the inner side of the fixed tube 110. The cam tube 170 has the cam grooves 171 and 173, and the cam follower 172. The cam grooves 171 and 173 are each formed inclined with respect to the optical axis OA. The cam groove 171 engages with the cam follower 142 of the inner tube 140. The cam groove 173 engages with the cam pin 112 of the fixed tube 110.

The cam follower 172 projects to the outer side radial direction from the coupling member 174, passes through the escape hole 144 of the inner tube 140, and engages with the translation groove 156 of the central tube 150. In this way, when the central tube 150 rotates about the optical axis OA, the driving force of rotating the cam tube 170 is transmitted from the cam follower 172 to the cam tube 170.

Further, the cam tube 170, in order to generate a driving force for moving the third lens frame 70, the fourth lens frame 80, and the fifth lens frame 90 which hold the other lens groups L3, L4 and L5, is further provided with other cam grooves and the like, not shown. Further, it is possible to remove areas in the cam tube 170 where no cam grooves or the like are formed, with the objective of reducing weight and the like. Thus, it is not limited to a complete cylinder.

The zoom ring 130 is mounted so as to rotate about the optical axis OA along the outer peripheral face of the fixed tube 110. Further, the zoom ring 130 has the guide groove 132 at its inner peripheral face. The guide groove 132 extends in a straight line parallel to the optical axis OA. The guide groove 132 engages with the cam follower 152 of the central tube 150. In this way, when the zoom ring 130 is rotationally operated, the central tube 150 also rotates about the optical axis OA.

The zoom ring turning amount detection portion 133 is disposed at the inner side of the zoom ring 130. The zoom ring turning amount detection portion 133 detects the amount of rotation of the zoom ring 130 when it is rotated by a rotation operation from the outside, and sends a rotation amount signal corresponding to the rotation amount to the later described barrel control portion 123.

The zoom ring turning amount detection portion 133 can be formed, for example, using a rotary scale which rotates along with the zoom ring 130, and an optical sensor which counts graduations on the rotary scale. Further, it can also be formed using a magnetic body which rotates along with the zoom ring 130, and a magnetic sensor which measures the changes in the magnetic field arising from the movement of the magnetic body. Further, these structures are merely examples, and other structures may also be used.

Further, at the outer peripheral face of the lens barrel 100, at the rear face side of the zoom ring 130 (the right side in the drawing), the focusing ring 120 is arranged. The focusing ring 120 is mounted so as to be freely rotatable about the optical axis OA along the outer peripheral face of the fixed tube 110.

The focusing ring rotation amount detection portion 121 is disposed at the inner side of the focusing ring 120.

The focusing ring rotation amount detection portion 121 detects the rotation amount of the focusing ring 120 when it is rotated by a rotation operation from the outside, and sends a rotation amount signal corresponding to the rotation amount to the later described barrel control portion 123.

The focusing ring rotation amount detection portion 121 can be formed, for example, using a rotary scale with rotates along with the focusing ring 120, and an optical sensor which counts the graduations on the rotary scale. Further, it can also be formed using a magnetic body which rotates along with the focusing ring 120, and a magnetic sensor which measures the changes in the magnetic field arising from the movement of the magnetic body. Further, these structures are merely examples, and other structures may also be used.

Further, the lens barrel 100, at the inner side of the fixed tube 110, is provided with the linear actuator 125, and the movement amount detection portion 127.

The linear actuator 125 is disposed at the rear face side of the support portion 114 which supports the guide bar at its front face side. The linear actuator 125 makes the guide bar 102 move in the optical axis OA direction by its driving.

By the driving of the guide bar 102 by this linear actuator 125, the second lens frame 190 joined to the guide bar 102, and the lens L2 held at the second lens frame 190 and the guide bar 104 move in the optical axis OA direction. In other words, the linear actuator 125 drives the second lens frame 190 (namely the lens L2) via the guide bar 102. The moving constitution of the lens L2 by this linear actuator 125 is mechanically completely independent of the moving constitution of the other lenses L1, L3, L4, and L5. Accordingly, it is possible to make the lens L2 move independently regardless of the other lenses L1, L3, L4 and L5.

The linear actuator 125 operates by a driving amount according to the driving signal output from the barrel control portion 123 described later, and drives the guide bar 102. In other words, the linear actuator 125 is controlled by the barrel control portion 123, and controls the movement of the lens L2.

In the lens barrel 100 of the present constitution, the movement of the lens L2 when changing the focal length (zooming) the lens and when focusing is carried out by the linear actuator 125 controlled by this barrel control portion 123.

Further, when the linear actuator 125 is not operating, it restricts the movement in the optical axis OA direction of the guide bar 102.

The movement amount detection portion 127 is disposed at the rear face side of the support portion 114 which supports the guide bar 102 at its rear face side. This movement amount detection portion 127 operates when the linear actuator 125 moves the guide bar 102, and detects the movement amount in the optical axis OA direction of the guide bar 102 with respect to the fixed tube 110, and transmits a movement amount signal corresponding to the movement amount to the barrel control portion 123.

The movement amount detection portion 127 may, for example, be constituted of a linear scale which moves integrally with the guide bar 102, and an optical sensor which counts this scale. Further, it may also be constituted of a magnetic body which moves along with the guide bar 102, and a magnetic sensor which measures the changes in the magnetic field arising from the movement of the magnetic body. Further, these are merely examples, and other constitutions may also be used.

The barrel control portion 123 carries out the driving control of the linear actuator 125 based on the rotation amount information of the zoom ring 130 input from the zoom ring turning amount detection portion 133, the rotation amount information of the focusing ring 120 input from the focusing ring rotation amount detection portion 121, and the movement information of the linear actuator 125 input from the movement amount detection portion 127.

Namely, the barrel control portion 123 is provided with computing information for computing the position of the lens L2 with respect to the rotation amount of the zoom ring 130, and when the zoom ring 130 is rotated, it computes the position of the lens L2 based on the rotation amount information input from the zoom ring turning amount detection portion 133, and drives the linear actuator 125 so as to move the lens L2 to this position.

Further, the barrel control portion 123 is provided with computing information for computing the position of the lens L2 with respect to the rotation amount of the focusing ring 120, and when the focusing ring 120 is rotated, it computes the position of the lens L2 based on the rotation amount information input from the focusing ring rotation amount detection portion 121, and drives the linear actuator 125 so as to move the lens L2 to this position.

The lenses L3, L4 and L5 and their respective third lens frame 70, fourth lens frame 80 and fifth lens frame 90 are coupled via an interlocking mechanism with the cam tube 170 which is rotationally operated by a rotation of the zoom ring 130. An existing driving mechanism may be arbitrarily chosen and applied as the interlocking mechanism. A detailed explanation is omitted, but for example, it may be constituted so as to guide and move the third lens frame 70, the fourth lens frame 80, and the fifth lens frame 90 by cam grooves and translation grooves provided at the cam tube 170 and the fixed tube. Further, it may be a structure which guides the third lens frame 70, the fourth lens frame 80, and the fifth lens frame 90 using the guide bars 102 and 104. In this way, the lenses L3, L4 and L5 are respectively moved in a prescribed relationship in the optical axis OA direction according to a rotation operation of the zoom ring 130.

Between the outer tube 161 and the zoom ring 130, the cover tube 165 is disposed so as to be fit coaxially with the fixed tube 110. The cover tube 165 advances and withdraws accompanying the outer tube 161, and seals the space between the outer tube 161 and the zoom ring 130. In this way, the cover tube 165 prevents the entry of dust into the inner portion of the lens barrel 100.

The lens barrel 100 constituted as described above continuously changes its focal length between the wide angle side end shown in FIG. 2, and the telephoto side end shown in FIG. 3 when the zoom ring 130 is rotationally operated, functioning as explained below. Further, in FIG. 2, the elements in common with FIG. 1 are assigned the same reference numbers and overlapping explanations are omitted. Further, in FIG. 2, a part of the members seen in FIG. 1 have moved by a rotation about the optical axis OA and are no longer visible.

When the zoom ring 130 is rotationally operated from the outside and rotated about the optical axis OA, rotational driving power is transmitted to the central tube 150 through the cam follower 152 engaged with the guide groove 132. When the central tube 150 rotates (in FIG. 3, the cam follower 152 which is moved by the rotation cannot be seen), the driving force is transmitted from the cam groove 154 to the cam follower 162 of the outer tube 161.

The cam follower 162 which has received the driving force is guided to the translation groove 146 of the inner tube 140, and makes a translational movement (movement in the optical axis OA direction). In this way, the first lens frame 160 joined to the front end of the outer tube 161, and the lens L1 held in the first lens frame 160 are integrally translationally moved.

Further, when the central tube 150 rotates, a rotational driving force is also transmitted to the cam follower 172 engaged with the translation groove 156 (in FIG. 2, the translation groove 156 and the cam follower 172, which have been moved by the rotation, are not visible). In this way, the cam tube 170 rotates about the optical axis OA along the inner peripheral face of the fixed tube 110.

When the cam tube 170 rotates, a driving force is transmitted to the cam follower 142 engaged with the cam groove 171. The cam follower 142 is guided by the translation groove 111 of the fixed tube 110, and translationally moves. In this way, the inner tube 140, and the central tube 150 engaged to the inner tube 140 by the engaging peripheral groove 158 translationally move.

Further, when the cam tube 170 rotates, it is droved by the can pin 112 of the fixed tube 110 engaged with the cam groove 173, and the cam tube 170 itself is also translationally moved.

In this way, when the zoom ring 130 is rotationally operated, the lenses L1, L3, L4 and L5 move and their mutual spacing changes.

Further, when the zoom ring 130 is rotationally operated, the barrel control portion 123 controls the linear actuator 125 based on the rotation amount of the zoom ring 130 input from the zoom ring turning amount detector portion 133, and moves the lens L2 to a prescribed position according to the rotation of the zoom ring 130.

By this sequence of operations, the lens barrel 100 is extended or shortened, and the spacing of the lenses L1, L2, L3, L4 and L5 changes, and the focal length of the overall optical system changes.

Here, the prescribed position of the lens L2 according to the rotation of the zoom ring 130 is a position which is moved by a movement amount necessary to change the focal length based on the rotation amount of the zoom ring 130, and added the amount of a focus adjustment correction amount to prevent a change in the focus distance (focus position).

Namely, in the lens barrel 100 of the present constitution where the lens L2 is a focusing lens, when the focal length changes, the movement distance of the lens L2 for arriving at infinity from the closest distance (the focusing movement range) changes (as the focal length becomes longer, the movement distance becomes larger). Because of this, when the focal length changes (during a zooming operation), the barrel control portion 123 moves the lens L2 the amount adding an amount of a focus adjustment correction which prevents the generation of a shift of the focus position before the zooming operation, to the movement corresponding to the change in the focal length. In this way, the focus position is maintained and focus shifts do not arise due to the zooming operation.

Further, the lens barrel 100 changes the focus distance by operating as described below when the focusing ring 120 is rotationally operated.

Namely, when the focusing ring 120 is rotationally operated, the rotation amount information of the focusing ring 120 is input from the focusing ring rotation amount detection portion 121 to the barrel control portion 123. The barrel control portion 123 controls the linear actuator 125 based on this rotation amount information of the focusing ring 120. In this way, the lens L2 moves in the optical axis OA direction and the focus distance changes. In FIG. 3, the moved lens L2 is shown by the double dotted line.

As described above, the moving constitution of the lens L2 by the linear actuator 125 is mechanically completely independent of the moving constitution of the other lenses L1, L3, L4 and L5, and therefore, during the rotational operation of the focusing ring 120, the lenses L1, L3, L4, and L5, other than the lens L2, do not move.

The barrel control portion 123 controls the linear actuator 125 such that the lens L2 moves between the closest distance and infinity by a constant predetermined rotation amount (rotational angle) of the focusing ring 120, regardless of the focal length. In other words, in this lens barrel 100, as described above, the focusing movement range (movement amount) of the lens L2 for arriving at infinity from the closest distance changes according to the focal length, but the barrel control portion 123 changes the rate of the movement amount of the lens L2 with respect to the rotation amount of the focusing ring 120 according to the focal length, and carries out control such that the rotation amount of the focusing ring 120 between the closest distance and infinity is constant and predetermined regardless of the focal length.

Further, the barrel control portion 123 corrects the generated driving signal with reference to the movement amount signal received from the movement amount detection portion 127. In this way, it is possible to accurately move the lens L2 correcting any movement amount errors of the guide bar 102 due to disturbances, and the lens barrel 100 can be focused quickly and with high accuracy.

Further, in the lens barrel 100, in the case of focusing by autofocus control by the control device 18 of the camera main body 10 shown in FIG. 1, the focusing ring 120 is not rotationally operated. In this case, the movement amount of the lens L2 required for focusing the lens barrel 100 is transmitted to the barrel control portion 123 as a required movement amount signal from the control device 18 of the camera main body 10. The barrel control portion 123 which has received the required movement amount signal generates a driving signal corresponding to the required movement amount, and provides it to the linear actuator 125.

The above embodiment provides the following effects:

(1) In the lens barrel 100, the lens L2 which is the focusing lens is supported by the guide bar 102, and is driven by a prescribed movement amount in the optical axis OA direction when focusing or when zooming by the driving of the guide bar 102 by the linear actuator 125. As a result, neither a coupling mechanism for a movement operation of the lens L2 when adjusting the focusing position (focus adjustment) by a rotation of the focusing ring 120, nor a coupling mechanism by a cam pin and a cam groove or the like for synchronizing and moving the lens L2 with the other lenses L1, L3, L4, and L5 when changing the focal length (during the zooming operation) by a rotation of the zoom ring 130 is necessary. As a result, the constitution can be much simplified, and it is possible to reduce costs. Further, because there is no mechanical movement operation of the lens L2 by a rotational force of the focusing ring 120 or the zoom ring 130, the torque of the rotational operation of the focusing ring 120 and the zoom ring 130 is lightened, and the operability is improved.

(2) In the lens barrel 100, only the lens L2 is moved in the optical axis OA direction by the driving of the guide bar 102 by the linear actuator 125. Because of this, the linear actuator does not require a great driving torque, and it can be constituted with a small form and at low cost.

(3) In the lens barrel 100, the linear actuator 125 which drives the guide bar 102 which supports the lens L2 is disposed at the rear face side of the support portion 114 which supports the guide bar 102 at its front face side. In this way, because the lens L2 and the linear actuator 125 are closely arranged, the guide bar 102 can be driven at a portion where its bending deformations and the like are small, and it is possible to drive with low driving resistance, and good smoothness and driving efficiency.

(4) In the lens barrel 100, the lens L2 which is the focusing lens is made to move in the optical axis OA direction by the driving of the guide bar 102 by the linear actuator 125. In this way, because the focus point movement when zooming is achieved within an allowed range, the air space adjustment which adjusts the relative position of the lens L2 with respect to the other lenses L1 and L3 can be simply carried out by adjusting the driving origin position of the guide bar 102 by the linear actuator 125. In the prior art, the adjustment of the air space was carried out by interposing an adjustment washer between the lens L2 and the holding frame holding the lens L2. This adjustment operation was a very troublesome operation whereby, after once assembling the lens barrel 100 and ascertaining the adjustment amount, a washer of a corresponding thickness was interposed, and reassembling. In the present constitution, such an adjustment operation has become unnecessary, and the adjustment operation time can be greatly reduced, and costs can be reduced.

Variations

The present invention is not limited to the above explained embodiment, and various variations and modifications such as those shown below are possible, and these are also within the scope of the present invention.

(1) In the present embodiment, the lens L2 of the lens barrel 100 is constituted so that the guide bar 102 which supports the lens L2 so as to be movable in the optical axis OA direction moves by the linear actuator 125. However, the constitution movably supporting the lens L2 and the constitution which moves the lens L2 (the actuator) may be constituted so as to be provided separately.

(2) In the present embodiment, of the guide bars 102 and 104 which support the lens L2 so as to be movable in the optical axis OA direction, one guide bar 102 is constituted so as to be driven by the linear actuator 125. However, the other guide bar 104 may be constituted so as to be driven by a second linear actuator 104. Then, when the electric power consumed by the driving by the actuator 125 or the like exceeds a prescribed value, or the moving speed of the lens L2 becomes slow, the other guide bar 104 may be driven by the second linear actuator. Further, it may also be constituted so as to be driven by the linear actuator 125 during zooming, and driven by the linear actuator 125 and the second linear actuator during focusing.

(3) In the present embodiment, the linear actuator 125 which drives and moves the guide bar 102 which supports the lens L2 so as to be moveable in the optical axis OA direction is disposed at the rear face side of the support portion 114 which supports the guide bar 102 at its front face side, and the movement amount detection portion 127 which detects the movement amount in the optical axis OA direction of the guide bar 102 is disposed at the rear face side of the support portion 114 which supports the guide bar 102 at its rear face side. However, the positions of disposing the linear actuator 125 and the movement amount detection portion 127 are not limited to this, and may be suitably set.

Further, the above embodiment and variations may be used in suitable combinations, but because the constitution of each embodiment is clear from the illustrations and explanations, detailed explanations thereof are omitted. Further, the present invention is not limited by the above explained embodiment.

What is claimed is:

1. A lens barrel comprising:
an image forming optical system including a first optical system and a second optical system,
a first holding member which holds the first optical system;
a second holding member which holds the second optical system;
a first driving portion which drives the first holding member in an optical axis direction during a magnification changing operation of the image forming optical system,
a guide shaft which has one end and another end and is provided along the optical axis direction, the one end of the guide shaft being fixed to the second holding member such that the guide shaft and the second holding member are movable integrally in the optical axis direction; and
a second driving portion which drives the second holding member independently from the first holding member in the optical axis direction by driving the guide shaft in the optical axis direction during focus adjustment of the image forming optical system and during the magnification changing operation.

2. The lens barrel according to claim 1, wherein
the second optical system is disposed further towards an image forming face side than the first optical system.

3. The lens barrel according to claim 1, further comprising a support member that is provided at two different positions in the optical axis direction at the image forming face side of the second optical system and supports the guide shaft so as to be movable in the optical axis direction, wherein the second driving portion is disposed at a position between support members at two different positions.

4. The lens barrel according to claim 3, wherein the second driving portion is disposed at a side closer to a support member disposed at a side closer to the second holding member than a support member disposed at a side further from the second holding member from among the support members at the two different positions.

5. The lens barrel according to claim 1, wherein a driving amount of the second optical system by the second driving portion during the focus adjustment is determined according to a focal length of the image forming optical system.

6. The lens barrel according to claim 1, wherein the first driving portion comprises a cam ring having a cam which engages with the first holding member which holds the first optical system.

7. The lens barrel according to claim 6, wherein the first driving portion drives the first optical system in the optical axis direction by driving the first holding member in the optical axis direction by way of rotation of the cam ring, during the magnification changing operation of the image forming optical system.

8. The lens barrel according to claim 1, comprising a support member which supports the guide shaft to be moveable in the optical axis direction.

9. The lens barrel according to claim 8, wherein the second driving portion comprises a linear actuator which drives the guide shaft with respect to the support member.

10. The lens barrel according to claim 9, wherein the linear actuator is arranged at the second optical system side of the support member.

11. The lens barrel according to claim 8, comprising:
a second guide shaft, which is provided to be moveable in the optical axis direction, fixed to the second holding member which holds the second optical system,
a second linear actuator which drives the second guide shaft, and
a control portion which selectively controls the driving of the second actuator.

12. An imaging device provided with the lens barrel of claim 1.

13. A method for driving a lens barrel with an image forming optical system including a first optical system and a second optical system in an optical axis direction, the method comprising:
holding the first optical system by a first holding member,
holding the second optical system by a second holding member, driving the first holding member in the optical axis direction during a magnification changing operation of the image forming optical system, the driving the first holding member being performed by a first driving portion, fixing a guide shaft to the second holding member which holds the second optical system such that the guide shaft and the second holding member are movable integrally in the optical axis direction, the guide shaft having one end and another end, and the one end of the guide shaft being fixed to the second holding member, and driving the second holding member independently from the first holding member, by driving the guide shaft in the optical axis direction during focus adjustment of the image forming optical system and during the magnification changing operation, the driving the second holding member being performed by a second driving portion.

14. The method according to claim 13, further comprising:
determining a driving amount of the second optical system by the second driving portion during the focus adjustment according to a focal length of the image forming optical system.

15. The method according to claim 13, further comprising:
engaging a cam ring of the first driving portion, which has a cam, with the first holding member which holds the first optical system.

16. The method according to claim 15, further comprising:
driving the first optical system in the optical axis direction by the first driving portion by driving the first holding member in the optical axis direction by way of rotation of the cam ring, during the magnification changing operation of the image forming optical system.

17. The method according to claim 13, further comprising:
supporting the guide shaft to be moveable in the optical axis direction with a support member.

18. The method according to claim 17, further comprising:
driving the guide shaft with respect to the support member by a linear actuator in the second driving portion.

19. The method according to claim 18, further comprising:
arranging the linear actuator at the second optical system side of the support member.

20. The method according to claim 17, further comprising:
fixing a second guide shaft, which is provided to be moveable in the optical axis direction, to the second holding member which holds the second optical system, driving the second guide shaft with a second linear actuator, and selectively controlling the driving of the second actuator with a control portion.

21. A method for taking an image by driving the lens barrel according to the method of claim 13.

* * * * *